(12) United States Patent
Smith

(10) Patent No.: US 6,407,338 B1
(45) Date of Patent: *Jun. 18, 2002

(54) COMPOSITE SEALANT AND SPLICE CASE THEREFOR

(75) Inventor: Donald J. Smith, Rancho Mirage, CA (US)

(73) Assignee: Uniseal, Inc., Evansville, IN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 707 days.

(21) Appl. No.: 08/783,693

(22) Filed: Jan. 15, 1997

(51) Int. Cl.$^7$ .............................................. H02G 15/113
(52) U.S. Cl. ...................................................... 174/92
(58) Field of Search .......................... 174/92, 93, 74 R, 174/74 A, 77 R, 82, 88 S; 29/868

(56) References Cited

U.S. PATENT DOCUMENTS

| | | | |
|---|---|---|---|
| 3,337,681 A | 8/1967 | Smith | 174/92 |
| 3,701,839 A | 10/1972 | Smith | 174/78 |
| 4,026,012 A | 5/1977 | Smith et al. | 29/874 |
| 4,332,975 A * | 6/1982 | Dienes | 174/77 R |
| 4,451,696 A * | 5/1984 | Beinhaur | 174/92 |
| 4,751,350 A * | 6/1988 | Eaton | 174/87 |
| 4,982,054 A * | 1/1991 | De Bruycker et al. | 174/87 |
| 5,574,259 A * | 11/1996 | Meltsch et al. | 174/92 X |
| 5,711,116 A * | 1/1998 | Hasan | 52/58 |

* cited by examiner

*Primary Examiner*—Chau N. Nguyen
(74) *Attorney, Agent, or Firm*—Barnes & Thornburg

(57) ABSTRACT

A protective splice case for communication cables includes two half tubular members and two cylindrical end seals. A composite material, in the form of a non-tacky, resilient and yieldable sealant non-releasably secured to an adhesive, is positioned between the two half members, with the adhesive contacting one of the two half members and the non-tacky sealant facing the other of the two half members. Also, the composite is positioned between the end seals and the half members, with the adhesive contacting the outer surfaces of the end seals and the non-tacky sealant facing the interior surfaces of the two half members. The result is a splice case which keeps the extraneous material such as water, dust, dirt and snow from reaching the interior of the splice case, and is yet reusable and reenterable for repairs and inspection.

31 Claims, 4 Drawing Sheets

COMPOSITE SEALANT AND SPLICE CASE THEREFOR

(b) CROSS-REFERENCES TO RELATED PATENT APPLICATIONS

In 1967 there was issued to the applicant U.S. Pat. No. 3,337,681 on Aug. 22, 1967 and entitled,"SPLICE CASE".

(c) STATEMENT AS TO RIGHTS TO INVENTIONS MADE UNDER FEDERALLY SPONSORED RESEARCH AND DEVELOPMENT

The applicant used his own resources in developing this invention and there was no assistance from the United States Government.

(d) BACKGROUND OF THE INVENTION

1. Field of the Invention

Electrical cables, especially communication cables, comprise a number of individual conducting members. These conducting members may be wires such as copper wire or may be a fiberoptic. The members are individual conductors of information.

Unfortunately, the communication cable may be damaged or cut or broken or even severed. With damage to the cable, it is necessary to splice together the individual conductors of information.

The communication cable as manufactured has a protective outer sheath of material. With damage to the communication cable, this outer protective sheath is broken and it is possible for extraneous material such as water, snow, dust and dirt to work into the interior of the communication cable and maybe even into the individual conductors of information.

In practice, and after the communication cable has been repaired, a splice case is positioned around the splice area of the cable so as to act as a protective outer sheet of material in the spliced area.

The splice case must be weather proof to rain, snow, hail, freezing weather, combination of rain and freezing weather, heat and high temperatures, ultra-violet light from the sun, from swaying due to the wind blowing the communication cable, fuel resistant to materials such as gasoline, diesel, oil and kerosene, flame resistant to low temperature flame, and must be resistant to the internal air pressure inside of the cable as the internal pressure inside of the cable is about 10 pounds per square inch, PSI.

Further, the splice case must be of such a construction that it can be readily assembled in the field. Quite often, in repairing the communication cable, it is necessary to be elevated off of the ground maybe 15 feet or more such as 30 feet. Therefore, the repair person must be able to manipulate the splice case for ease of positioning over the spliced area of the communication cable. Many times the cable is underground or in a vault.

2. Description of the Prior Art

The splice case of U.S. Pat. No. 3,337,681 is still used. Further, the splice case of U.S. Pat. No. 3,337,681 minus the flexible, yieldable material 24, i.e., neoprene, polyethylene, polypropylene or lead as specifically provided in claim 11 of U.S. Pat. No. 3,337,681 is extensively used in the United States. It is estimated that there are approximately 200,000 splice cases sold each year in the United States and these splice cases do not have the flexible yieldable material 24 of the splice case U.S. Pat. No. 3,337,681.

Instead of the flexible yieldable material 24, there is used a mastic. One of the mastics used is a B Sealing Tape developed by Bell Laboratories. This mastic is placed between the flanges 16 of two half tubular members 14. The mastic seals between the two flanges and provides good protection from the elements for the conducting cables 50 and 52 inside of the tubular member 10. There is a disadvantage with the use of this mastic. The disadvantage is that if it be necessary to open the tubular member 10, it is difficult because of the adhesive property or the stickiness of the mastic. Once the tubular member 10 is open and the repair work accomplished, it is then difficult to join together the two half tubular members 14. Before joining the two members 14, the mastic must be removed from the flanges 16. The removal of the mastic from the flanges 16 is time consuming and difficult which adds to the expense of repairing the conductors 50 and 52. Often, all of the mastic cannot readily be removed from the flanges.

The B Sealing Tape, on a weight basis, comprises approximately 27% butyl rubber, approximately 41% carbon black, and approximately 27% polybutene with minor quantities of other additives.

A second mastic, referred to as R Sealing Tape, was introduced about 1980. This mastic is releasable so as to make the entry of the tubular member 10 easier. A problem exists in regard to the quality control of the R Sealing Tape in that it is difficult to accurately make the desirable adhesive property. If the R Sealing Tape is made sufficiently sticky or sufficiently adhesive to stay in place during installation of the conducting cables 50 and 52 in the tubular member 10, it is difficult, when another repair is made, to open the tubular member 10. Further, in opening the tubular member 10 the shape of the tubular member 10 is often damaged or destroyed requiring full replacement of the member. On the other hand, if the R Sealing Tape does not have sufficient adhesive property and is not sufficiently sticky, the R Sealing Tape falls away during installation on the flanges 16, and there results an imperfect seal of the tubular member 10.

The uncured R Sealing Tape comprises acrylic rubber, hydrated, aluminum, chlorinated polyethylene, polymeric plasticizers, and polyisobutylene.

It is desirable to have a mastic which has good adhesive properties and good sealing and resilient properties and yet allows the two half tubular members 14 to be readily separated from each other even though joined by the mastic. To the best of my knowledge and information, the prior art has not solved this problem.

(e) SUMMARY OF THE INVENTION

Objects and Advantages

The objective of this invention is to provide a mastic or a composite sealant which attaches itself to the closure of the flanges 16 during installation so that the sealant will not fall away from the closure or splice case thereby making it easier to assemble the splice case;

A further object is to provide such a mastic which acts as a sealant between the two half members of the splice case and yet which mastic allows the splice case to be readily opened to make adjustments in regard to the electrical conductors inside of the splice case.

In other words, the mastic or sealant must have sufficient adhesive properties to adhere to the closure when the two half-members of the closure are being joined and being used and yet these adhesive properties must readily yield to the separation of the two half-members of the closure if it be desirable to re-enter the splice case;

The sealant must positively seal the closure members of the splice case and yet must make it possible to readily open and separate the two closure members of the splice case;

An object of this invention is to provide a composite sealant comprising a sealing material and also an adhesive material so that the adhesive material will adhere to part of the splice case while changing its configuration to function as a sealing material while the sealing material will change its shape to provide a sealing member with respect to the other part of the splice case and yet allow the two half-members of the splice case to be readily separated;

The deformable member should be compounded so that it wants to return to its original shape and size when the two half-members are separated;

Another object of this invention is to provide a composite sealant comprising a deformable member for sealing with part of the splice case and also an adhesive member for attaching itself to the other part of the splice case and which composite sealant is resistant to rain, snow, heat, fuel, sunlight, ultra-violet light, flame-resistant, and of sufficient body to resist movement due to an internal pressure of about 10 pounds per square inch inside of the cable inside of the splice case;

Another important object is to provide an inexpensive composite sealant having a deformable member for adjusting to the configuration of the splice case and also an adhesive member for adhering to part of the splice case;

An additional object is to provide such a composite sealant which can be readily inventoried and stored for use;

A further object is to provide such a sealant which is adaptable to many shapes and sizes such as in cross-sections, round, square, and rectangular;

A further object is to provide such a composite sealant which can be stored in straight sections or coiled round on itself such as in a tape;

A further object is to eliminate the yieldable liner in the half tubular members and to replace the liner with a less expensive composite strip comprising a sealant and an adhesive.

Additional objects, advantages and novel features of the invention will be set forth in part in the description which follows, and in part will become apparent to those skilled in the art upon examination of the following or may be learned by the practice of the invention. The objects and advantages of the invention may be realized and attained by means of the instrumentalities and combinations particularly pointed out in the appended claims.

(f) BRIEF DESCRIPTION OF THE DRAWINGS

In the drawings, it is seen that:

Figure 3:
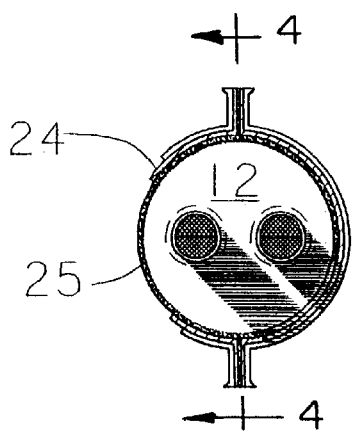
FIG. 3 is an end view of the splice case showing the tubular member, the sealant, the end seal and two electrical cables in the end seal.
Figure 4:
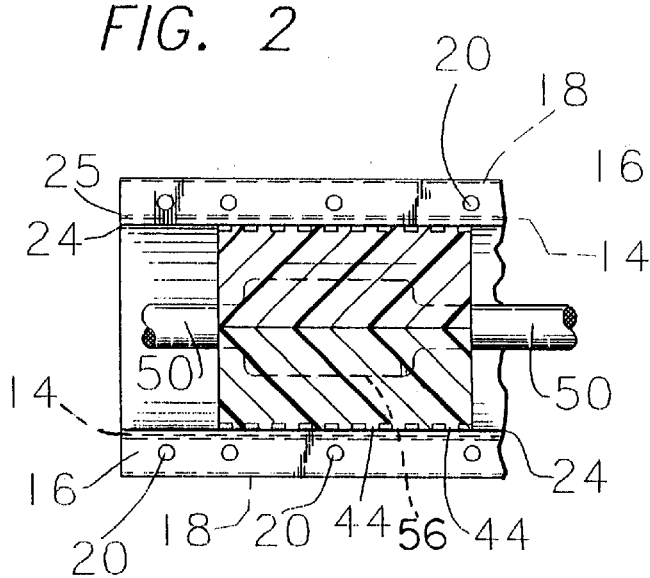
Figure 5:
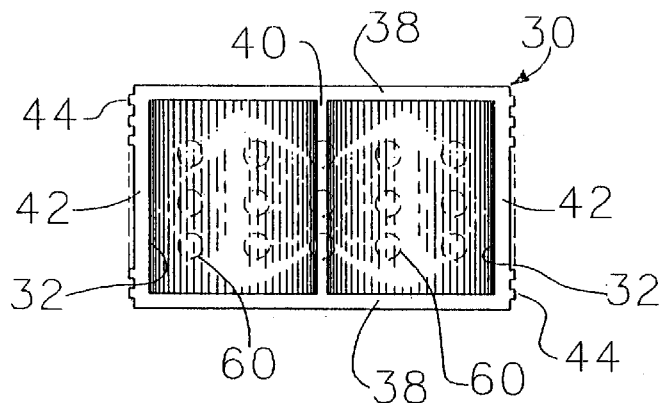
Figure 6:
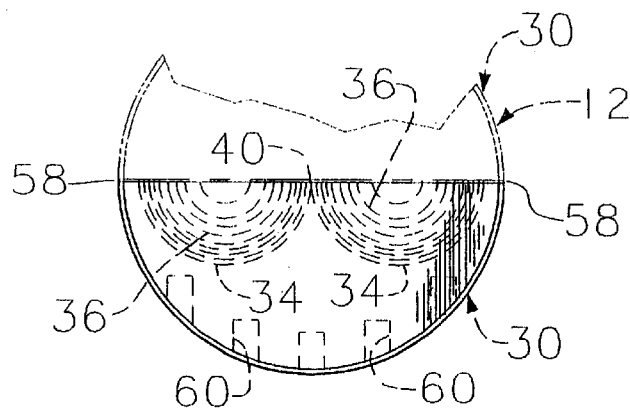
Figure 7:
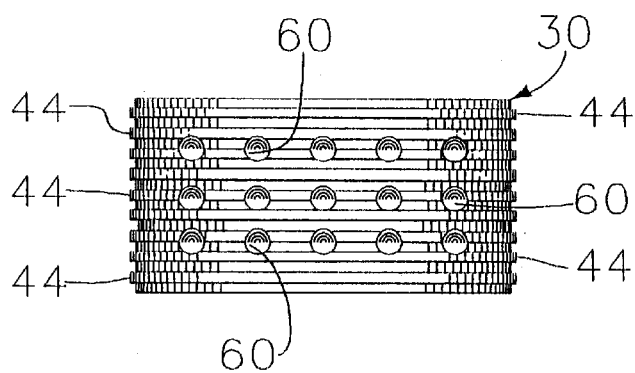
Figure 8:
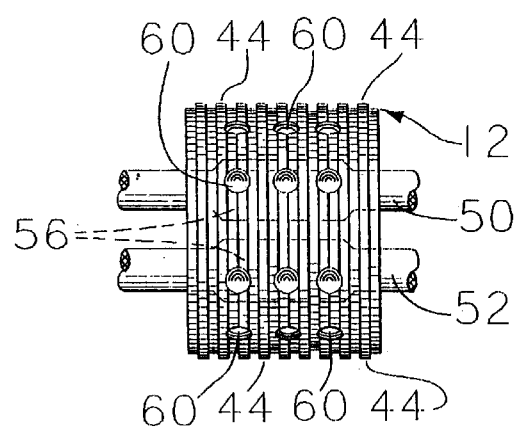
Figure 9:
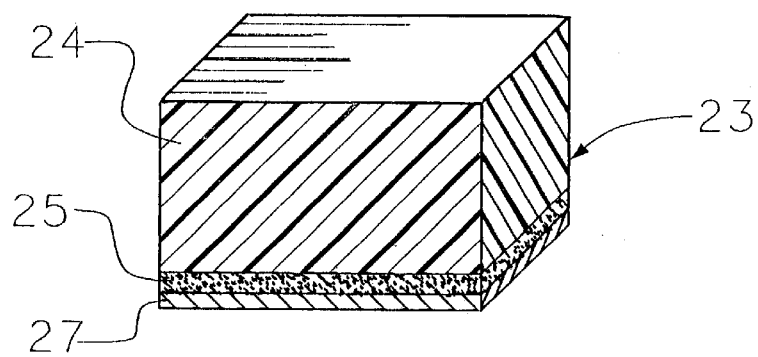
Figure 10:
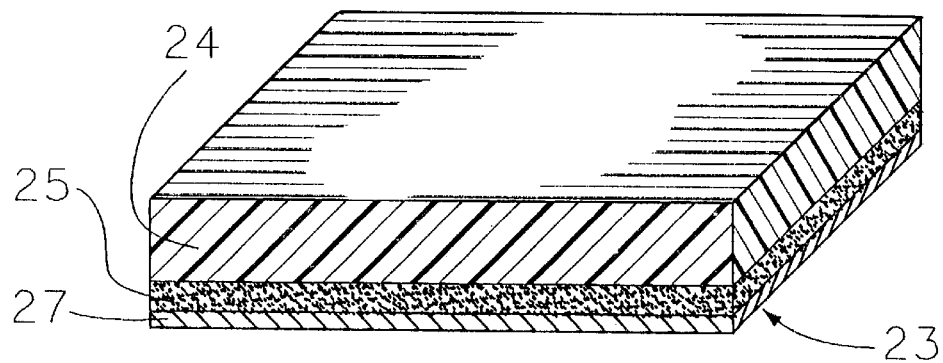
Figure 11:
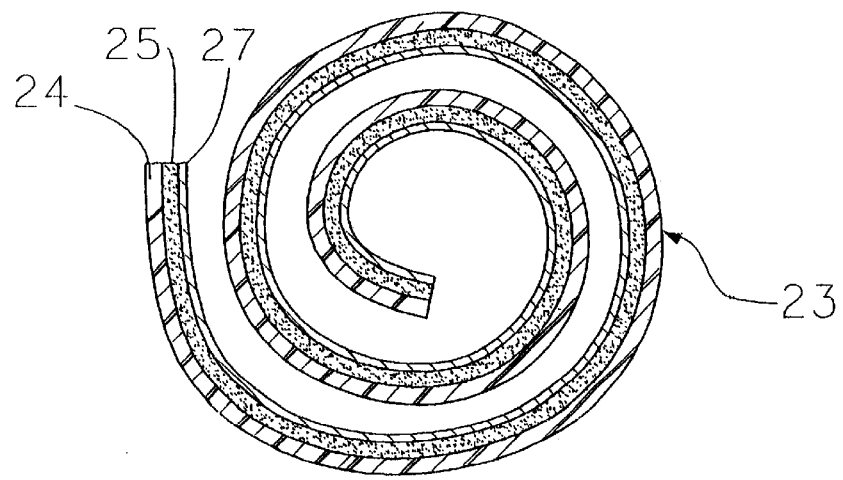
Figure 12:
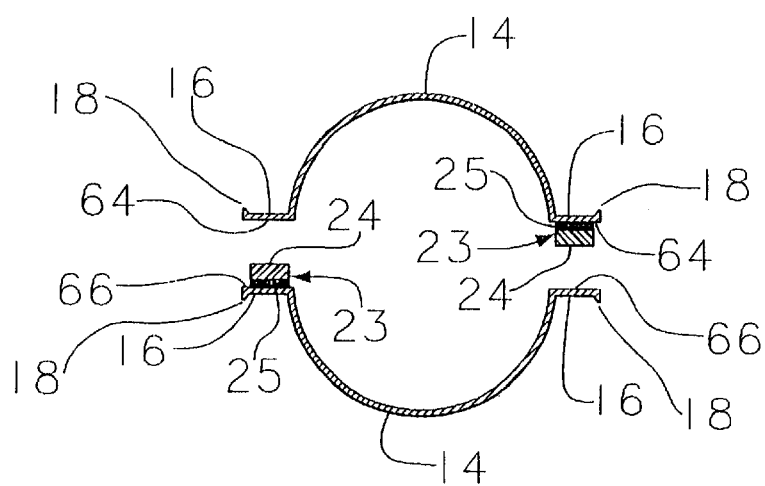
Figure 13:
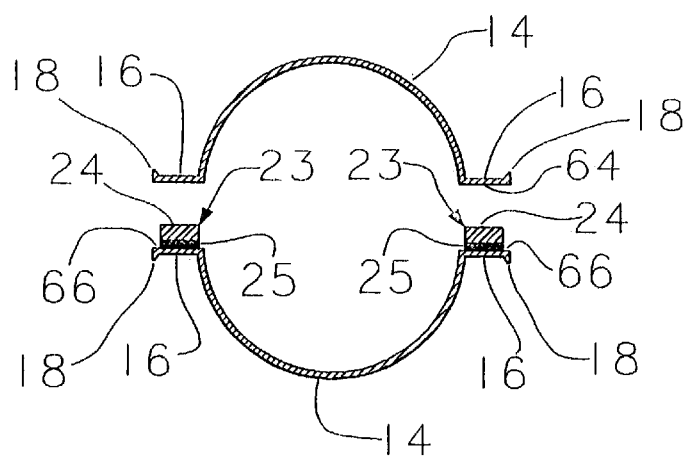
Figure 14:
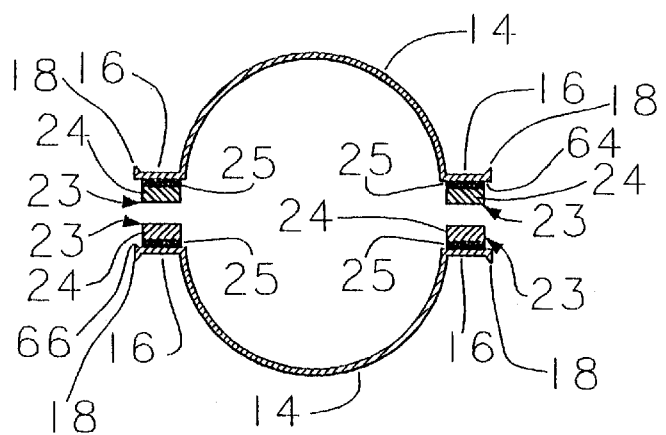

FIG. 4, on an enlarged scale, taken on line 4—4 of FIG. 3, is a cross-sectional view illustrating a half longitudinal member, the sealant, an end seal, and in phantom an electrical cable which has tape or the like wrapped around it to fit in the end seal;

FIG. 5 is a view looking at the interior of an end seal and shows two-cylindrical longitudinal cavities, side walls, end walls and the circumferential peripheral ridges;

FIG. 6 is a fragmentary view looking at the end of an end seal, and shows one-half of the end seal in solid line and indicia for indicating where the end seal should be cut to receive an electrical cable, and fragmentarily shows the other half of the end seal;

FIG. 7 is a top view of a end seal and illustrates the circumferential peripheral ridges on the end seal;

FIG. 8 is a side view of an end seal and shows two cables in the end seal and which cables have been wrapped to increase their size to fit in the semi-cylindrical longitudinal cavities;

FIG. 9, in an end view on an enlarged scale, illustrates the composite as comprising a sealant, a separator and an adhesive between the sealant and the separator;

FIG. 10 is a side elevational view of the composite of FIG. 9;

FIG. 11 is a side elevational view of the composite of FIG. 9 in a coil;

FIG. 12 is an end elevation of the two tubular members in a separated state and with the sealant attached to the two tubular members;

FIG. 13 is an end elevational view of the two tubular members in a separated state and with the sealant attached to one of the tubular members in two spaced-apart flanges; and FIG. 14 is an end elevational view showing the sealant on the outer surfaces of the flanges for ease of assembling and disassembling of the splice case.

(g) DESCRIPTION OF THE PREFERRED EMBODIMENT(S)

In the drawings it is seen that the splice case comprises a tubular member 10 and two end seals 12.

The tubular member 10 actually is composed of two half tubular members 14 having in a lateral cross-sectional view a configuration of a semi-circular member. On the free ends of the semi-circular member 14 there is a flange 16 which bends back on the member 14 to form a lip 18. On each member 14 there are two flanges 16.

Figure 1:
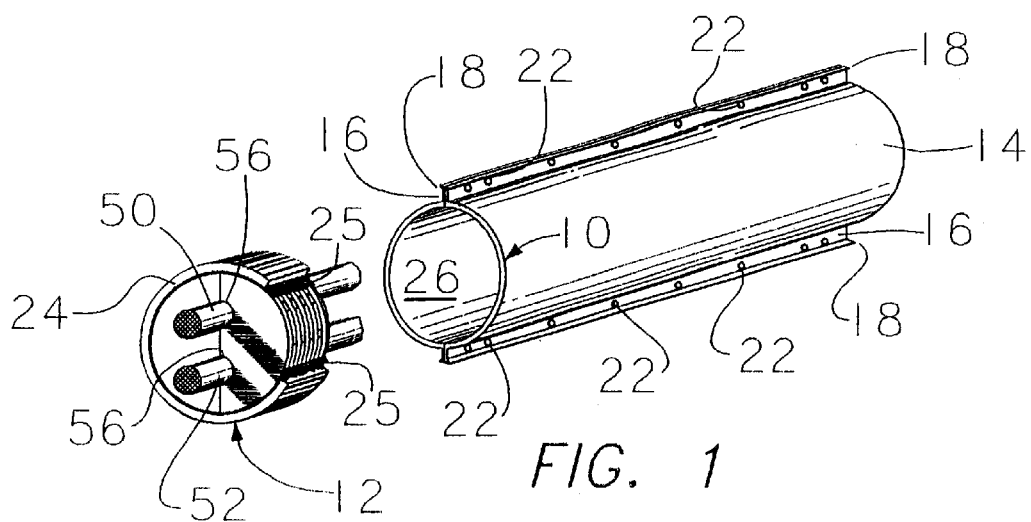
FIG. 1 is an exploded perspective view showing a tubular member, an end seal, and a fragmentary part of electrical cables running through the end seal.

In the flanges 16 there are holes 20. To assemble the two half tubular members 14 into the tubular member 10 a number of nut and bolt combinations 22 are positioned in the openings 20 of two adjacent flanges 16. As is seen, in FIGS. 1 and 3, there results the tubular member 10.

There is a composite 23 comprising a sealant 24 and an adhesive 25. A separator 27 may be placed over the adhesive 25 and peeled away when the composite 23 is being applied.

Figure 2:
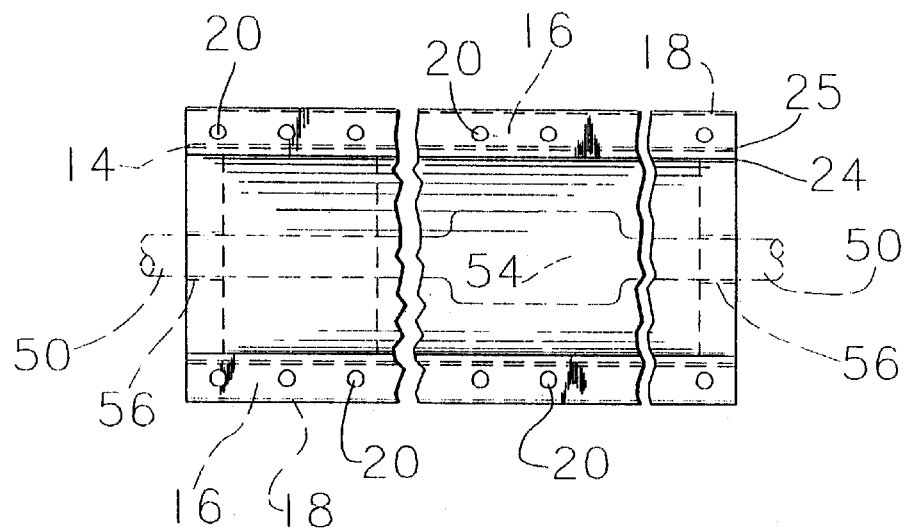
FIG. 2 is a fragmentary side elevational view of the splice case and shows a cable, in phantom line, entering the splice case, the end seals in phantom, and that portion of the cable which has been spliced.

In FIGS. 2, 3, and 4 the composite 23 is attached to the flanges 16 by means of adhesive 25.

FIGS. 12, 13, and 14 illustrate the positioning of the composite 23 on the flanges 16.

In FIGS. 12 and 13, it is seen that there is an upper half tubular member 14. The reference numeral 64 has been assigned to the surface of the flange 16 and which surface faces the lower half tubular member 14. The reference numeral 66 has been assigned to the upper surface 16 of the flanges 16 and the lower half tubular member 14. For ease of separation of the two half tubular members 14, if necessary, to disassemble the splice case the composite 23 is positioned on the surface 66 of the lower half tubular member 14. The adhesive 25 is positioned on the surface 66 so that the sealant 24 is near the surface 64 of the upper half tubular member 14. As the sealant 24 is not an adhesive per se, it is possible to readily separate the lower half tubular member 14 from the upper half tubular member 14 to disassemble the splice case and to make additional changes in the conducting cables 50 and 52.

In FIG. 14, it is seen that the composite 23 can be positioned on the surface of 64 of the flanges 16 and also the composite 23 can be positioned on the surface of 66 of the flanges 16. This means that the sealants 24 will be in contact with each other. With the sealants 24 being in contact with each other it is easy to separate the two half tubular members 14 of the splice case. Also, it is not necessary to try and clean an adhesive 25 away from the surface 64 or the surface 66 upon separating the two half members 14 from each other in the disassembly of a splice case. The separation of a splice case into the two half tubular members 14 is a clean separation without a messy adhesive adhering to the two half tubular members 14 and to the hands and equipment of the person assembling and disassembling the splice case.

The half tubular member 14, 16 and 18 is preferably made of a resistant metal, such as stainless steel. In actual usage I have found stainless steel to be desirable. However, many splice cases made as described in the reference U.S. Pat. No. 3,337,681 are of plastic material such as polypropylene.

One particular model has a half-longitudinal tubular member of a length of about seventeen and seven-eights inches (17⅞") and the stainless steel of a thickness of approximately 0.040 to 0.045 inches. The stainless steel may be 302 stainless steel. The flange 16 may have a width of nine-sixteenths of an inch (9/16") inside and the lip may be approximately one-eighth of an inch (⅛") in length. The holes 20 may be one-fourth (¼") holes.

The end seal 12 comprises two mating half tubular members 30, see FIGS. 5 and 6. In FIG. 5 the observer is looking at the interior of the half tubular member 30. In FIG. 6 the observer is looking at the end of a half tubular member 30, see the drawing in solid line. From FIGS. 5 and 6 it is seen that the member 30 is, in lateral cross-sectional view, of a semi-circular cylindrical configuration.

In FIG. 5 it is seen that the member 30 is hollow and comprises two longitudinal cavities 32 in a lateral cross-sectional view of a semi-circular configuration. Actually, in FIG. 6 there is illustrated by phantom lines 34 the semi-circular appearance of these cavities. In FIG. 6 it is seen that there are numerous concentric phantom lines 36. The specifically identified line 34 indicates the dimension of the two cavities 32 in the member 30. The other lines 36 are indicia to assist a repairman in the cutting of end walls 38 for receiving an electrical cable. At the junction of the two cavities 32 there is indicated a wall 40.

In FIG. 5 it is seen that the semi-cylindrical longitudinal cavities 32 define an end wall 38 and side walls 42 in the half tubular member 30. On the half tubular member 30 there are a number of circumferential peripheral ridges 44.

The member 30 may be made of plastic such as polyethylene, or polypropylene or another suitable plastic. I have made the member 30 from black polyethylene. The length of the member 30 or the side 42 is approximately one and eleven-sixteenths inches (1¹¹/₁₆") and the thickness of the wall 42 at its narrowest place is approximately 0.150". The radius of the member 30 at the end wall 38 is approximately one and seven-eighths inches (1⅞") and the thickness of the end wall 38 is approximately three-thirty-seconds of an inch (³/₃₂"). The thickness of a ridge 44 is approximately 0.025 inch, and the radius of the cavity 32 is approximately 0.925 inch. These are the dimensions for a particular member 30.

It is to be realized that the dimensions of the tubular member 10 and the end seal 12 may vary to accommodate the particular electrical cable to be protected.

In FIGS. 3 and 4, it is seen that the sealant is on the outside of member 12. The adhesive 25 is in contact with the circumference of the member. The sealant 24 is on the outside of the adhesive 25 and contacts the interior surface of the half member 14 to conform to the shape of the interior surface. As a result, there is a tight seal between the member 12 and the sealant 24. Also, there is a tight seal between the sealant 24 and the half member 14. These tight seals preclude the introduction of extraneous material such as water, dirt, dust, snow, and air into the interior of the tubular member 10.

For the purpose of illustration assume that two electrical cables 50 and 52 are to be spliced. After the splicing has been completed, see FIG. 2, wherein the splicing is indicated at 54, the spliced cables are in a condition to be protected. The end seal 12 is then placed around the two cables 50 and 52. The repairman may estimate the size of the cables 50 and 52 and by means of his pocket knife cut along the appropriate indicia 36 in the end wall 38. Then, a tape 56 may be wrapped around the cables 50 and 52. The purpose of the tape 56 is to enlarge the size of the cables 50 and 52 so they fit snugly in the cavities 32 in the end seal 12. Then, some plastic tape or a mastic 58 may be placed along the side walls 42 and the end walls 38 and the two members 30 pressed together to fit snugly around the electrical cables 50 and 52 and the tape 56. It is to be realized that there are two end seals 12. One end seal on each side of the splice 54. Both of these end seals will fit inside of the tubular member 10.

The sealant 24 and the adhesive 25 can be positioned on the circumference of the end seals 30 to prevent extraneous material entering the tubular member 10.

The half longitudinal tubular members are now ready to be positioned around the two end seals 12, the cables 50 and 52 between these two end seals and the splice 54. The composite 23 is placed on the inner surfaces of the flanges 16 of a first tubular member 10 to be of the flanges with the adhesive 25 contacting the flanges 16 so as to definitely position the composite 23 on the flange 16. The sealants 24 are now free to contact the inner surfaces to be of the flanges 16 of the second tubular member 10 for sealing purposes. The two half longitudinal tubular members 14 are brought together so that the flanges 16 of the two members are adjacent to each other and with the holes 20 in alignments. Then, the nuts and bolts 22 may be arranged in these holes 20 and tightened so as to draw the two half longitudinal tubular members together. The sealant 24 and the adhesive 25 between the two half tubular members 14 contact are squeezed and compressed so as to form a fluid tight seal. Also, the ridges 44 of the end seal 12 become embedded in the adhesive 25 and compressed upon contacting the inner surfaces of the two tubular members 14 so as to form a fluid tight seal and mechanically secure the end seals in position.

In FIG. 12 it is seen that the composite 23 is positioned on the right surface 64 of the upper half tubular member 14 so that the adhesive 25 contacts 16. The sealant 24 faces the half tubular member 14. Also, the composite 23 is positioned on the left surface 66 of the lower half tubular member 14 with the adhesive 25 contacting the surface 66. The sealant 24 faces the upper half tubular member 14.

In FIG. 13 the composite 23 is placed on the surface 66 of the left flange 16 and the surface 66 of the right flange 16 of the lower half tubular member 14. The adhesive 25 adheres to the surface 66 and the sealant 24 faces the upper half tubular member 14.

In FIG. 14 it is seen that the composite 23 is placed on the surface 64 of the left flange 16 and the surface 64 of the right flange 16 of the upper half tubular member 14. Also, the composite 23 is placed on the surface 66 of the left flange 16 and also on the surface 66 of the right flange 16 of the lower half tubular member 14. The adhesive 25 is in contact with the surface 64 and 66. The sealant 24 is facing the other half tubular member 14.

From the above, it is seen that the positioning of the composite 23 on the flanges 16 of the half tubular member 14 has been described.

It is seen that the composite 23 functions as a gasket to form a fluid tight joint between the two half tubular members 14 or between the tubular members 14 and the end seal 12.

Normally, in the electrical cables 50 and 52 there is a positive internal pressure of approximately 10 pounds per square inch gauge. This is to insure that no fluid and also no extraneous material such as water, dirt, dust, snow, and air will enter in the cable 50 or the cable 52. With this positive pressure inside the cable there will be a positive pressure inside of the splice case comprising the tubular member 10 and the end seal 12.

In FIGS. 6, 7 and 8 it is seen that the member 30 may have a number of circular indentations 60. These indentations 60 serve two purposes. One is that in the molding of the members 30 there is a large volume of plastic. In order to prevent the plastic from curing away and shrinking away from the mold and possibly cracking, there are pins in the mold. These pins leave the indentations 60 which decrease the actual volume of plastic employed. The indentations 60 also serve the purpose of acting as additional gripping means for the composite 23. As is recalled, the composite 23 comprises an adhesive 25 which is a yieldable material. The composite 23 and the adhesive 25 will flow, to a degree, into the indentations 60 so as to more firmly positions the member 12 with the member 10.

The splice case is easily assembled with the aid of the composite 23.

The composite 23 is made of the sealant 24 and the adhesive 25. The sealant 24 can be cured EPDM, halogenated butyl, hydrated aluminum, resins, paraffinic oil or polybutene, or polyisbutylene. The adhesive 25 can be butyl, halogenated butyl, hydraded alum, resinic polybutenes, and polyisbutylene. The separator 27 can be waxed paper.

The sealant 24 under pressure will deform so as to conform to the surface it contacts so as to form a tight seal to preclude the entry of extraneous material.

From the foregoing it is seen that I have presented a splice case which has few parts and yet offers protection to the spliced cable. In fact, the splice case may be buried in the ground and due to the stainless steel outer shell there is little corrosion, if any corrosion, of the protective outer shell. The inner material, such as the composite 23, is not subject to corrosion or erosion. Also, the end seal 12, be it of polyethylene or polypropylene or other suitable plastic, is not subject to corrosion or erosion. Further, it is seen that it is relatively simple and takes very little time to assemble the splice case to protect spliced cable. Further, it is seen that there are fluid tight joints between the two half longitudinal tubular members of the splice case; between the two mating half tubular members of the end seal; and between the end seal and the two half longitudinal tubular members. As a result there is little possibility of fluid entering into the splice case and damaging the splice 54 of the electrical cables 50 and 52.

Also, a workman may readily disassemble the splice case by unscrewing the nut and bolt combination 22 of the tubular member 10 and taking apart the two half tubular members 14. Then, the workman may examine the splice 54 or may do what other examination he considers to be necessary. Further, if necessary, the end seal 12 may be disassembled.

In addition, the tubular member 10 and the end seals 12 accommodate all reasonable sizes of communication cable. If necessary, for extremely large sizes of communication cable, the members 10 and 12 may be made in larger sizes. But for standard communication cable the members 10 and 12 accommodate all suitable sizes. In certain instances there is employed a communication cable having an inner sheath, a metallic coating around the inner sheath or a metallic tube around the inner sheath and then an outer sheath around the metallic tube. The end seal 12 may be cut along the appropriate indicia 36 to accommodate the outer sheath. The outer sheath and the metallic tube may be removed so as to expose the inner sheath. Then another end seal 12 may be cut along the indicia 36 to accommodate the inner sheath 12. In other words, instead of two end seals 12, one at each end of the tubular member 10, there are four end seals 12 with two of the end seals being at each end of the tube 10. In another instance when it is not possible to splice or repair the cable at one location there may be employed two splice cases next to each other or separated by a few inches. In this instance these two splice cases will supply protection for the cable.

From this it is seen that it is possible to readily disassemble the splice case for examination of the electrical cable or cables therein and also to readily assemble the splice case.

A composite for assisting in joining two separate objects into an integral structure and also for allowing said integral structure to be readily disassembled into said two separate objects, and comprising a yieldable sealant; an adhesive adhering to and in combination with said sealant; said yieldable sealant being capable of conforming to the configuration of an adjacent object and also being capable of being separated from said adjacent object with minimum adherence to said adjacent object; and said adhesive being capable of adhering to an adjacent material to such a degree that upon separation of said composite from other adjacent material said adhesive adheres to said adjacent material.

A composite for assisting in joining two separate objects into an integral structure and also for allowing said integral structure to be readily disassembled into said two separate objects, and comprising a yieldable sealant; an adhesive adhering to and in combination with said sealant; said yieldable sealant being capable of conforming to the configuration of an adjacent object and also being capable of being separated from said adjacent object with minimum adherence to said adjacent object; said adhesive being capable of adhering to an adjacent material to such a degree that upon separation of said composite from other adjacent material said adhesive adheres to said adjacent material; one of the functions of said adhesive being to position and securely hold said composite on said adjacent material while working with said adjacent material.

A composite for assisting in joining two separate objects into an integral structure and also for allowing said integral structure to be readily disassembled into said two separate objects, and comprising a yieldable sealant; an adhesive adhering to and in combination with said sealant; a separator on the outside of said adhesive to preclude the adhesive adhering to a material until the separator is removed from said adhesive.

A process for making a composite and comprising selecting a yieldable sealant; selecting an adhesive; connecting together said yieldable sealant and said adhesive to form said composite; positioning a separator over said adhesive to preclude said adhesive contacting another material until the separator is removed.

A composite made by a process comprising selecting a yieldable sealant; selecting an adhesive; connecting together said yieldable sealant and said adhesive to form said composite; positioning a separator over said adhesive to preclude said adhesive contacting another material until the separator is removed.

A protective cover for a cable splice, said cover comprising a cylindrical case comprising two semi-circular members identified as a first member and a second member; said first member having a flange on each side identified as a first flange and as a second flange; said second member having a flange on each side identified as a third flange and a fourth flange; means to unite said first flange and said third flange; means to unite said second flange and said fourth flange; a composite comprising a sealant and an adhesive positioned between said first flange and said third flange with said adhesive contacting and adhering to said first flange and with said sealant contacting said third flange for ease of separation of said first flange and said third flange; and a composite comprising a sealant and an adhesive positioned between said second flange and said fourth flange with said adhesive contacting and adhering to said second flange and with said sealant contacting said fourth flange for ease of separation of said second flange and said fourth flange.

A protective cover for a cable splice, said cover comprising a cylindrical case comprising two semi-circular members identified as a first member and a second member; said first member having a flange on each side identified as a first flange and as a second flange; said second member having a flange on each side identified as a third flange and a fourth flange; means to unite said first flange and said third flange; means to unite said second flange and said fourth flange; a composite comprising a sealant and an adhesive positioned between said first flange and said third flange with said adhesive contacting and adhering to said first flange and with said sealant contacting said third flange for ease of separation of said first flange and said third flange; a composite comprising a sealant and an adhesive positioned between said second flange and said fourth flange with said adhesive contacting and adhering to said second flange and with said sealant contacting said fourth flange for ease of separation of said second flange and said fourth flange; said cylindrical case having two ends; end seals being inside of said cylindrical case and being positioned near respective ends of said cylindrical case; each end seal being composed of two mating semi-circular members; each member of each end seal having two semi-circular longitudinal cavities; each end seal having end walls; two of said members in mating relation defining two enclosed cylindrical longitudinal cavities; a composite comprising a sealant and an adhesive; and said composite surrounding the circumference of said end seal and being inside of said cylindrical case.

A protective cover for a cable splice, said cover comprising a cylindrical case comprising two semi-circular members identified as a first member and a second member; said first member having a flange on each side identified as a first flange and as a second flange; said second member having a flange on each side identified as a third flange and a fourth flange; means to unite said first flange and said third flange; means to unite said second flange and said fourth flange; a composite comprising a sealant and an adhesive positioned between said first flange and said third flange with said adhesive contacting and adhering to said first flange and with said sealant contacting said third flange for ease of separation of said first flange and said third flange; a composite comprising a sealant and an adhesive positioned between said second flange and said fourth flange with said adhesive contacting and adhering to said second flange and with said sealant contacting said fourth flange for ease of separation of said second flange and said fourth flange; said cylindrical case having two ends; end seals being inside of said cylindrical case and being positioned near respective ends of said cylindrical case; each end seal being composed of two mating semi-circular members; each member of each end seal having two semi-circular longitudinal cavities; each end seal having end walls; two of said members in mating relation defining two enclosed cylindrical longitudinal cavities; a composite comprising a sealant and an adhesive; said composite surrounding the circumference of said end seal and being inside of said cylindrical case; said adhesive contacting said end seal and said sealant contacting the interior of said cylindrical case for ease of separation of said end seal and said cylindrical case; said end seals have an external diameter larger that the internal diameter of said cylindrical case.

A process for making a protective cover for a cable splice and comprising forming a cylindrical case comprising two semi-circular members identified as a first member and a second member; forming said first member to have a flange on each side and identified as a first flange and as a second flange; forming said second member to have a flange on each side identified as a third flange and a fourth flange; positioning a composite comprising a sealant and an adhesive between said first flange and said third flange with said adhesive contacting and adhering to said first flange and with said sealant contacting said third flange for ease of separation of said first flange and said third flange; positioning a composite comprising a sealant and an adhesive between said second flange and said fourth flange with said adhesive contacting and adhering to said second flange and with said sealant contacting said fourth flange for ease of separation of said second flange and said fourth flange; uniting said first flange and said third flange; and uniting said second flange and said fourth flange.

A process for making a protective cover for a cable splice and comprising forming a cylindrical case comprising two semi-circular members identified as a first member and a second member; forming said first member to have a flange on each side and identified as a first flange and as a second flange; forming said second member to have a flange on each side identified as a third flange and a fourth flange; positioning a composite comprising a sealant and an adhesive between said first flange and said third flange with said adhesive contacting and adhering to said first flange and with said sealant contacting said third flange for ease of separation of said first flange and said third flange; positioning a composite comprising a sealant and an adhesive between said second flange and said fourth flange with said adhesive contacting and adhering to said second flange and with said sealant contacting said fourth flange for ease of separation of said second flange and said fourth flange; uniting said first flange and said third flange; uniting said second flange and said fourth flange; forming said protective cover with two ends; positioning end seals inside of said cylindrical case; forming each end seal to have two mating semi-circular members; forming each member of each end seal to have a semi-circular longitudinal cavity; forming each end seal with end walls; positioning two of said members in mating relation to define an enclosed longitudinal cavity; and positioning a composite comprising a sealant and an adhesive in a surrounding relationship to the circumference of said end seal and being inside of said cylindrical case.

A process for making a protective cover for a cable splice and comprising forming a cylindrical case comprising two semi-circular members identified as a first member and a second member; forming said first member to have a flange on each side and identified as a first flange and as a second flange; forming said second member to have a flange on each side identified as a third flange and a fourth flange; positioning a composite comprising a sealant and an adhesive between said first flange and said third flange with said adhesive contacting and adhering to said first flange and with said sealant contacting said third flange for ease of separation of said first flange and said third flange; positioning a composite comprising a sealant and an adhesive between said second flange and said fourth flange with said adhesive contacting and adhering to said second flange and with said sealant contacting said fourth flange for ease of separation of said second flange and said fourth flange; uniting said first flange and said third flange; uniting said second flange and said fourth flange; with said composite positioning said adhesive to contact said end seal and positioning said sealant to contact the interior of said cylindrical case for ease of separation of said end seal and said cylindrical case; forming said seals to have an external diameter larger than the internal diameter of said cylindrical case.

A process for making a protective cover for a cable splice and comprising forming a cylindrical case comprising two semi-circular members identified as a first member and a second member; forming said first member to have a flange on each side and identified as a first flange and as a second flange; forming said second member to have a flange on each side identified as a third flange and a fourth flange; positioning a composite comprising a sealant and an adhesive between said first flange and said third flange with said adhesive contacting and adhering to said first flange and with said sealant contacting said third flange for ease of separation of said first flange and said third flange; positioning a composite comprising a sealant and an adhesive between said second flange and said fourth flange with said adhesive contacting and adhering to said second flange and with said sealant contacting said fourth flange for ease of separation of said second flange and said fourth flange; uniting said first flange and said third flange; uniting said second flange and said fourth flange; forming said protective cover with two ends; positioning end seals inside of said cylindrical case; forming each end seal to have two mating semi-circular members; forming each member of each end seal to have a semi-circular longitudinal cavity; forming each end seal with end walls; positioning two of said members in mating relation to define an enclosed longitudinal cavity; positioning a composite comprising a sealant and an adhesive in a surrounding relationship to the circumference of said end seal and being inside of said cylindrical case; with said composite positioning said adhesive to contact said end seal and positioning said sealant to contact the interior of said cylindrical case for ease of separation of said end seal and said cylindrical case; forming said seals to have an external diameter larger than the internal diameter of said cylindrical case.

A combination of a cable having a cable splice and a protective cover for said cable splice, said combination comprising a cylindrical case comprising two semi-circular members identified as a first member and a second member; said first member having a flange on each side identified as a first flange and as a second flange; said second member having a flange on each side identified as a third flange and a fourth flange; means to unite said first flange and said third flange; means to unite said second flange and said fourth flange; a composite comprising a sealant and an adhesive positioned between said first flange and said third flange with said adhesive contacting and adhering to said first flange and with said sealant contacting said third flange for ease of separation of said first flange and said third flange; a composite comprising a sealant and an adhesive positioned between said second flange and said fourth flange with said adhesive contacting and adhering to said second flange and with said sealant contacting said fourth flange for ease of separation of said second flange and said fourth flange; said cylindrical case having two ends; end seals being inside of said cylindrical case and being positioned near respective ends of said cylindrical case; each end seal being composed of two mating semi-circular members; each member of each end seal having two semi-circular longitudinal cavities; each end seal having end walls; two of said members in mating relation defining two enclosed cylindrical longitudinal cavities; a composite comprising a sealant and an adhesive; and said composite surrounding the circumference of said end seal and being inside of said cylindrical case; and said cable passing through the end walls and the end seals and into the cylindrical case with the splice inside of the cylindrical case.

A combination of a cable having a cable splice and a protective cover for said cable splice, said combination comprising a cylindrical case comprising two semi-circular members identified as a first member and a second member; said first member having a flange on each side identified as a first flange and as a second flange; said second member having a flange on each side identified as a third flange and a fourth flange; means to unite said first flange and said third flange; means to unite said second flange and said fourth flange; a composite comprising a sealant and an adhesive positioned between said first flange and said third flange with said adhesive contacting and adhering to said first flange and with said sealant contacting said third flange for ease of separation of said first flange and said third flange; a composite comprising a sealant and an adhesive positioned between said second flange and said fourth flange with said adhesive contacting and adhering to said second flange and with said sealant contacting said fourth flange for ease of separation of said second flange and said fourth flange; said cylindrical case having two ends; end seals being inside of said cylindrical case and being positioned near respective ends of said cylindrical case; each end seal being composed of two mating semi-circular members; each member of each end seal having two semi-circular longitudinal cavities; each end seal having end walls; two of said members in mating relation defining two enclosed cylindrical longitudinal cavities; a composite comprising a sealant and an adhesive; and said composite surrounding the circumference of said end seal and being inside of said cylindrical case; said cable passing through the end walls and the end seals and into the cylindrical case with the splice inside of the cylindrical case; a composite comprising a sealant and an adhesive; said composite surrounding the circumference of said end seal and being inside of said cylindrical case; said adhesive contacting said end seal and said sealant contacting the interior of said cylindrical case for ease of separation of said end seal and said cylindrical case; said end seals have an external diameter larger that the internal diameter of said cylindrical case.

A process for making a combination of a cable having a cable splice and a protective cover for said cable splice, said process comprising; forming a cylindrical case comprising two semi-circular members identified as a first member and a second member; forming said first member to have a flange on each side and identified as a first flange and as a second flange; forming said second member to have a flange on each side identified as a third flange and a fourth flange; positioning a composite comprising a sealant and an adhesive between said first flange and said third flange with said adhesive contacting and adhering to said first flange and with said sealant contacting said third flange for ease of separation of said first flange and said third flange; positioning a composite comprising a sealant and an adhesive between said second flange and said fourth flange with said adhesive contacting and adhering to said second flange and with said sealant contacting said fourth flange for ease of separation of said second flange and said fourth flange; uniting said first flange and said third flange; uniting said second flange and said fourth flange; forming said protective cover with two ends; positioning end seals inside said cylindrical case; forming each end seal of two mating semi-circular members; forming each member of each end seal with two longitudinal cavities; forming each end seal with end walls; positioning two of said members in a mating relationship to define two enclosed longitudinal cavities; positioning a composite comprising a sealant and an adhesive around the circumference of said end seal and inside of said cylindrical case; and passing said cable through the end walls and the end seals and into the cylindrical case with the cable splice inside the cylindrical case.

A process for making a combination of a cable having a cable splice and a protective cover for said cable splice, said process comprising; forming a cylindrical case comprising two semi-circular members identified as a first member and a second member; forming said first member to have a flange on each side and identified as a first flange and as a second flange; forming said second member to have a flange on each side identified as a third flange and a fourth flange; positioning a composite comprising a sealant and an adhesive between said first flange and said third flange with said adhesive contacting and adhering to said first flange and with said sealant contacting said third flange for ease of separation of said first flange and said third flange; positioning a composite comprising a sealant and an adhesive between said second flange and said fourth flange with said adhesive contacting and adhering to said second flange and with said sealant contacting said fourth flange for ease of separation of said second flange and said fourth flange; uniting said first flange and said third flange; uniting said second flange and said fourth flange; forming said protective cover with two ends; positioning end seals inside said cylindrical case; forming each end seal of two mating semi-circular members; forming each member of each end seal with two longitudinal cavities; forming each end seal with end walls; positioning two of said members in a mating relationship to define two enclosed longitudinal cavities; positioning a composite comprising a sealant and an adhesive around the circumference of said end seal and inside of said cylindrical case; passing said cable through the end walls and the end seals and into the cylindrical case with the cable splice inside the cylindrical case; employing a composite comprising a sealant and an adhesive; positioning said composite to surround the circumference of said end seal and to be inside of said cylindrical case; positioning said adhesive to contact said end seal and positioning said sealant to contact said cylindrical case for ease of separation of said end seal and said cylindrical case; and selecting said ends to have an external diameter larger than the internal diameter of said cylindrical case.

In a protective cover for a cable splice wherein said cover comprises; a cylindrical case comprising two semi-circular inert members; each member having a flange in each side; means to unite adjacent flanges of the two members; end seals; said end seals being inside of the cylindrical case; each end seal being composed of two mating semi-circular members; each member of each end seal having two semi-circular longitudinal cavities; each end seal having end walls; an improvement comprising: a composite comprising a sealant and an adhesive; positioning said composite between adjacent flanges of said two members to function as a seal between said adjacent flanges; and positioning said composite around the circumference of said end seal to function as a seal between said end seal and the interior of said cylindrical case.

In a protective cover for a cable splice wherein said cover comprises; a cylindrical case comprising two semi-circular inert members; each member having a flange in each side; means to unite adjacent flanges of the two members; end seals; said end seals being inside of the cylindrical case; each end seal being composed of two mating semi-circular members; each member of each end seal having two semi-circular longitudinal cavities; each end seal having end walls; an improvement comprising: a composite comprising a sealant and an adhesive; positioning said composite between adjacent flanges of said two members to function as a seal between said adjacent flanges; positioning said composite around the circumference of said end seal to function as a seal between said end seal and the interior of said cylindrical case; positioning said adhesive of said composite on the circumference of said end seal to allow said sealant to contact the interior of said cylindrical case; a cable passing through the end walls of the end seals and into the cylindrical case; a cable passing through the end walls of the end seals and into the cylindrical case.

In a combination of a protective cover for a cable splice and wherein said cable splice is in said protective cover and comprising; a cylindrical case comprising two semi-circular inert members; each member having a flange in each side; means to unite adjacent flanges of the two members; end seals; said end seals being inside of the cylindrical case; each end seal being composed of two mating semi-circular members; each member of each end seal having two semi-circular longitudinal cavities; each end seal having end walls; an improvement comprising: a composite comprising a sealant and an adhesive; positioning said composite between adjacent flanges of said two members to function as a seal between said adjacent flanges; positioning said composite around the circumference of said end seal to function as a seal between said end seal and the interior of said cylindrical case; a cable passing through the end walls of the end seals and into the cylindrical case with the cable splice inside the cylindrical case.

What I claim is:

1. A composite for forming a fluid-tight seal between two separate objects when said objects are joined into a protective closure and also for allowing said protective closure to be readily and repeatedly disassembled into said two separate objects, said composite comprising:
   a. a substantially non-adhesive, resilient and yieldable sealant; and
   b. an adhesive non-releasably adhering to and in combination with said sealant; the adhesive contacting and adhering to only the sealing interfaces of one of the two objects at the time of installation with the non-adhesive sealant contacting the sealing interfaces of the other of the two objects, so that when the two objects are joined to form the protective closure the composite sealant forms a fluid-tight seal between them while allowing the protective closure to be readily and repeatedly disassembled into said two separate objects and reassembled back into said fluid-tight protective closure.

2. A composite according to claim 1 and comprising:
   a. said yieldable sealant being capable of conforming to the configuration of said other object and also being capable of being separated from said other object with minimum adherence to said other object; and
   b. said adhesive being capable of adhering to said one object to such a degree that upon separation of said composite from said other object, said adhesive continues to adhere to said one object.

3. A composite according to claim 1 and comprising:
   a. a separator disposed on the outside of said adhesive to protect the adhesive until the separator is removed from said adhesive.

4. The composite of claim 3, wherein the separator is a waxed paper.

5. The composite of claim 1, wherein the sealant is selected from a group consisting of cured EPDM, halogenated butyl, hydrated aluminum, resins, paraffinic oil, polybutene and polyisobutylene.

6. The composite of claim 1, wherein the adhesive is selected from a group consisting of halogenated-butyl; hydrated aluminum, resinic polybutenes and polyisobutylene.

7. A protective cover for a cable splice, said cover comprising:
   a. a cylindrical case comprising two semi-circular members identified as a first member and a second member;
   b. said first member having a flange on each side identified as a first flange and as a second flange;
   c. said second member having a flange on each side identified as a third flange and a fourth flange;
   d. means to unite said first flange and said third flange;
   e. means to unite said second flange and said fourth flange;
   f. a composite comprising a substantially non-adhesive, resilient and yieldable sealant non-releasably secured to an adhesive positioned between said first flange and said third flange with said adhesive contacting and adhering only to said first flange and with said sealant contacting said third flange for ease of separation of said first flange and said third flange; and
   g. a composite comprising a substantially non-adhesive, resilient and yieldable sealant non-releasably secured to an adhesive positioned between said second flange and said fourth flange with said adhesive contacting and adhering only to said second flange and with said sealant contacting said fourth flange for ease of separation of said second flange and said fourth flange.

8. A protective cover according to claim 7 and comprising:
   a. said cylindrical case having two ends;
   b. end seals being inside of said cylindrical case and being positioned near respective ends of said cylindrical case;
   c. each end seal being composed of two mating semi-circular members;
   d. each member of each end seal having two semi-circular longitudinal cavities;
   e. each end seal having end walls;
   f. two of said members in mating relation defining two enclosed cylindrical longitudinal cavities;
   g. a composite comprising a substantially non-adhesive, resilient and yieldable sealant non-releasably secured to an adhesive; and
   h. said composite surrounding the circumference of each of said said end seals and being inside of said cylindrical case.

9. A protective cover according to claim 8 and comprising:
   a. said adhesive contacting said end seal and said sealant contacting the interior of said cylindrical case for ease of separation of said end seal and said cylindrical case.

10. A protective cover according to claim 8 and comprising:
    a. said end seals have an external diameter larger than the internal diameter of said cylindrical case.

11. The protective cover of claim 7 or 8, wherein the sealant is selected from a group consisting of cured EPDM, halogenated butyl, hydrated aluminum, resins, paraffinic oil, polybutene and polyisobutylene.

12. The protective cover of claim 7 or 8, wherein the adhesive is selected from a group consisting of halogenated butyl, hydrated aluminum, resinic polybutenes and cured polyisobutylene.

13. A process for making a protective cover for a cable splice and comprising:
    a. forming a cylindrical case comprising two semi-circular members identified as a first member and a second member;
    b. forming said first member to have a flange on each side and identified as a first flange and as a second flange;
    c. forming said second member to have a flange on each side identified as a third flange and a fourth flange;
    d. positioning a composite comprising a substantially non-adhesive, resilient and yieldable sealant non-releasably secured to an adhesive between said first flange and said third flange with said adhesive contacting and adhering only to said first flange and with said sealant contacting said third flanged for ease of separation of said first flange and said third flange;
    e. positioning a composite comprising a substantially non-adhesive, resilient and yieldable sealant non-releasably secured to an adhesive between said second flange and said fob flange Math said adhesive contacting and adhering only to said second flange and with said sealant contacting said fourth flange for ease of separation of said second flange and said fourth flange;
    f. uniting said first flange and said third flange; and
    g uniting said second flange and said fourth flange.

14. A process for making a protective cover according to claim 13, and comprising:
    a. forming said protective cover with two ends;
    b. positioning end seals inside of said cylindrical case at each end thereof;
    c. forming each end seal to have two mating semi-circular members;
    d. forming each member of each end seal to have a semi-circular longitudinal cavity;
    e. forming each end seal with end walls;
    f. positioning two of said members in mating relation to define an enclosed longitudinal cavity; and
    g. positioning a composite comprising a substantially non-adhesive, resilient and yieldable sealant non-releasably secured to an adhesive in a surrounding relationship to the circumference of each of said end seals and being inside of said cylindrical case.

15. A process for making a protective cover according to claim 13 and comprising:
   a. with said composite positioning said adhesive to contact said end seal and positioning said sealant to contact the interior of said cylindrical case for ease of separation of said end seal and said cylindrical case.

16. A process for making protective cover according to claim 13 and comprising:
   a. forming said seals to have an external diameter larger than the internal diameter of said cylindrical case.

17. The process of claim 13 or 14, wherein the sealant is selected from a group consisting of cured EPDM, halogenated butyl, hydrated aluminum, resins, paraffinic oil, polybutene and polyisobutylene.

18. The process of claim 13 or 14, wherein the adhesive is selected from a group consisting of halogenated butyl, hydrated aluminum, resinic polybutenes and polyisobutylene.

19. A combination of a cable having a cable splice and a protective cover for said cable splice, said combination comprising:
   a. a cylindrical case comprising two semi-circular members identified as a first member and a second member;
   b. said first member having a flange on each side identified as a first flange and as a second flange;
   c. said second member having a flange on each side identified as a third flange and a fourth flange;
   d. means to unite said first flange and said third flange;
   e. means to unite said second flange and said fourth flange;
   f. a composite comprising a substantially non-adhesive, resilient and yieldable sealant non-releasably secured to an adhesive positioned between said first flange and said third flange with said adhesive contacting and adhering only to said first flange and with said sealant contacting said third flange for ease of separation of said first flange and said third flange;
   g. a composite comprising a substantially non-adhesive, resilient and yieldable sealant ton-releasably secured to an adhesive positioned between said second flange and said fourth flange with said adhesive contacting and adhering only to said second flange and with said sealant contacting said fourth flange for ease of separation of said second flange and said fourth flange;
   h. said cylindrical case having two ends;
   i. end seals being inside of said cylindrical case and being positioned near respective ends of said cylindrical case;
   j. each end seal being composed of two mating semi-circular members;
   k. each member of each end seal having two semi-circular longitudinal cavities;
   l. each end seal having end walls;
   m. two of said members in mating relation defining two enclosed cylindrical longitudinal cavities;
   n. a composite comprising a substantially non-adhesive, resilient and yieldable sealant non-releasably secured to an adhesive; and
   o. said composite surrounding the circumference of said end seal and being inside of said cylindrical case; and
   p. said cable passing through the end walls and the end seals and into the cylindrical case with the splice inside of the cylindrical case.

20. A combination according to claim 19 and comprising:
   a. said adhesive contacting said end seal and said sealant contacting the interior of said cylindrical case for ease of separation of said end seal and said cylindrical case.

21. A combination according to claim 19 and comprising:
   a. said end seals have an external diameter larger than the internal diameter of said cylindrical case.

22. The combination of claim 19, wherein the sealant is selected from a group consisting of cured EPDM, halogenated butyl, hydrated aluminum, resins, paraffinic oil, polybutene and polyisobutylene.

23. The combination of claim 19, wherein the adhesive is selected from a group consisting of halogenated butyl; hydrated aluminum, resinic polybutenes and cured polyisobutylene.

24. A process for making a combination of a cable having a cable splice and a protective cover for said cable splice, said process comprising:
   a. forming a cylindrical case comprising two semi-circular members identified as a first member and a second member;
   b. forming said first member to have a flange on each side and identified as a first flange and as a second flange;
   c. forming said second member to have a flange on each side identified as a third flange and a fourth flange;
   d. positioning a composite comprising a substantially non-adhesive, resilient and yieldable sealant non-releasably secured to an adhesive between said first flange and said third flange with said adhesive contacting and adhering only to said first flange and with said sealant contacting said third flange for ease of separation of said first flange and said third flange;
   e. positioning a composite comprising a substantially non-adhesive, resilient and yieldable sealant non-releasably secured to an adhesive between said second flange and said fourth flange with said adhesive contacting and adhering only to said second flange and with said sealant contacting said fourth flange for ease of separation of said second flange and said fourth flange;
   f. uniting said first flange and said third flange;
   g. uniting said second flange and said fourth flange;
   h. forming said protective cover with two ends;
   i. positioning end seals inside said cylindrical case at each end thereof;
   j. forming each end seal eof two mating semi-circular members;
   k. forming each member of each end seal with two longitudinal cavities;
   l. forming each end seal with end walls;
   m. positioning two of said members in a mating relationship to define two enclosed longitudinal cavities;
   n. positioning a composite comprising a substantially non-adhesive, resilient and yieldable sealant non-releasably secured to an adhesive around the circumference of said end seal and inside of said cylindrical case; and
   o. passing said cable through the end walls and the end seals and into the cylindrical case with the cable splice inside the cylindrical case.

25. A process for making a combination according to claim 24 and comprising:
   a. positioning said adhesive to contact said end seal and positioning said sealant to contact said cylindrical case for ease of separation of said end seal and said cylindrical case.

26. A process for making a combination according to claim 24 and comprising:

a. selecting said ends to have an external diameter larger than the internal diameter of said cylindrical case.

27. In a protective cover for a cable splice wherein said cover comprises:
   a. a cylindrical case comprising two semi-circular inert members;
   b. each member having a flange in each side;
   c. means to unite adjacent flanges of the two members;
   d. end seals;
   e. said end seals being inside of the cylindrical case at each end thereof;
   f. each end seal being composed of two mating semi-circular members;
   g. each member of each end seal having two semi-circular longitudinal cavities; and
   h. each end seal having end walls;
an improvement comprising:
   i. a composite comprising a substantially non-adhesive, resilient and yieldable sealant non-releasably secured to an adhesive;
   j. positioning said composite between adjacent flanges of said two members to function as a seal between said adjacent flanges with said adhesive contacting and adhering only to one of said adjacent flanges and with said sealant contacting the other of said adjacent flanges for ease of separation of said adjacent flanges; and
   k. positioning said composite around the circumference of each of said end seals to function as a seal between said end seal and the interior of said cylindrical case.

28. In a protective cover according to claim 27 and comprising:
   a. positioning said adhesive of said composite on the circumference of said end seal to allow said sealant to contact the interior of said cylindrical case.

29. In a protective cover according to claim 28 and comprising:
   a. a cable passing through the end walls of the end seals and into the cylindrical case.

30. In a protective cover according to claim 27 and comprising:
   a. a cable passing through the end walls of the end seals and into the cylindrical case.

31. In a combination of a protective cover for a cable splice and wherein said cable splice is in said protective cover and comprising:
   a. a cylindrical case comprising two semi-circular inert members;
   b. each member having a flange in each side;
   c. means to unite adjacent flanges of the two members;
   d. end seals;
   e. said end seals being inside of the cylindrical case at each end thereof;
   f. each end seal being composed of two mating semi-circular members;
   g. each member of each end seal having two semi-circular longitudinal cavities; and
   h. each end seal having end walls;
an improvement comprising:
   i. a composite comprising a substantially non-adhesive, resilient and yieldable sealant non-releasably secured to an adhesive;
   j. positioning said composite between adjacent flanges of said two members to function as a seal between said adjacent flanges with said adhesive contacting and adhering only to one of said adjacent flanges and with said sealant contacting the other of said adjacent flanges for ease of separation of said adjacent flanges;
   k. positioning said composite around the circumference of each of said end seals to function as a seal between said end seals and the interior of said cylindrical case; and
   l. a cable passing through the end walls of the end seals and into the cylindrical case with the cable splice inside the cylindrical case.

* * * * *